US005412158A

United States Patent [19]

Yearwood

[11] Patent Number: 5,412,158

[45] Date of Patent: May 2, 1995

[54] ELECTRIC FENCE WIRE INSULATION

[76] Inventor: M. Deon Yearwood, Rt. 2, Box 23, Hydro, Okla. 73048

[21] Appl. No.: 93,148

[22] Filed: Jul. 19, 1993

[51] Int. Cl.$^{6}$ .......... A01K 3/00

[52] U.S. Cl. .......... 174/163 F; 174/161 R; 174/161 F; 174/158 F; 174/158 R; 248/72; 256/10

[58] Field of Search .......... 174/163 F, 166 R, 161 R, 174/161 F, 158 F, 158 R; 248/72, 73; 256/10, 47, 54, 55, 68, DIG. 3

[56] References Cited

U.S. PATENT DOCUMENTS

| | | | |
|---|---|---|---|
| Re. 25,341 | 3/1963 | Majewski | 174/158 R |
| 862,298 | 8/1907 | Webb | 256/55 |
| 1,271,596 | 7/1918 | Mayer | 174/161 R |
| 2,300,674 | 11/1942 | Johns et al. | 174/161 R |
| 2,437,344 | 3/1948 | Behlmann | 174/163 F |
| 2,437,613 | 3/1948 | Redpath | 256/10 X |
| 2,571,495 | 10/1951 | Steinmayer | 174/161 R |
| 2,623,094 | 12/1952 | Markley | 174/161 R |
| 2,650,263 | 8/1953 | Steinmayer | 174/161 R |
| 2,740,827 | 4/1956 | Smalley | 174/162 |
| 3,820,758 | 6/1974 | Berg, Jr. et al. | 256/10 |
| 4,077,611 | 3/1978 | Wilson | 174/163 F |

FOREIGN PATENT DOCUMENTS

| | | | |
|---|---|---|---|
| 0268164 | 12/1964 | Australia | 174/158 R |

OTHER PUBLICATIONS

Eveready, "Electric Fence Controller", 1939, Instruction Book by National Carbon Company, Inc. Cl. 256-10.

*Primary Examiner*—Leo P. Picard
*Assistant Examiner*—Hyung S. Sough
*Attorney, Agent, or Firm*—Robert K. Rhea

[57] ABSTRACT

An electric wire insulators for connection with a T-shaped corner fence post is formed by a generally U-shaped rigid mounting member having parallel legs transversely spanning a T-shaped post. A pair of U-shaped bracket members each journalling a dielectric spool are provided with a threaded rod rigidly connected with the bight portion of the respective U-shaped bracket and threadedly entering the respective mounting member leg for impinging the mounting member on the T-shaped post. One of the U-shaped brackets may be angularly rotated about the axis of its threaded rod for disposing the axis of one dielectric spool normal to the axis of the other dielectric spool.

2 Claims, 1 Drawing Sheet

ELECTRIC FENCE WIRE INSULATION

Background of The Invention

This invention relates to single wire agricultural boundary electric fences for maintaining livestock in an enclosure such as a pasture.

1. Field of the Invention

An electric fence comprises an uninsulated strand of wire extending between fence posts at a predetermined elevation above the surface of the earth.

The wire is connected with a source of electrical energy and carries a direct current of predetermined voltage and the posts supporting the wire are usually metallic, thus, requiring the wire to be insulated from contact with the respective post.

An insulator secured to the respective post supports the wire in spaced relation with respect to the post.

This electric fence wire insulator accomplishes the above features but has additional features more fully explained hereinbelow.

2. Description of the Prior Art

U.S. Pat. No. 3,820,758 issued Jun. 28, 1974 to Berg Jr. et al for ELECTRIC FENCE INSULATION FOR T-SHAPED POSTS discloses a plastic C-clamp engageable with the flanges of a metal T-post in which a manually flexed wing extending laterally from the C-shape grips and releases the flanges of the T-post. A pair of upwardly open horizontally spaced apart hooks project laterally from the C-clamp and support an electrically charged wire. A tongue member similarly projects laterally of the C-clamp overlying the wire between the hooks to maintain the wire attached to the supporting clamp.

The device of this patent functions very well for supporting electric fence wire between line posts of a fence.

The wire insulator of this invention similarly supports line posts of electric fence and additionally provides insulation for the wire when the fence makes an angle turn in its direction, such as a 90° turn, and additionally provides an insulator for the end post of a fence extending along the boundary of a pasture or field.

Other patents such as U.S. Pat. Nos. 2,650,263 issued Aug. 25, 1953 to Steinmayer for BRACKET CONSTRUCTION and number 2,740,827 issued Apr. 3, 1956 to Smalley for INSULATOR BRACKET generally represent the state-of-the-art.

These and other patents disclose U-shaped spool supporting insulator brackets attached to relatively tall poles supporting power transmission lines and similarly do not address the problem of insulating the wire from the supporting post at an angular turn of the wire in the direction of the power line.

SUMMARY OF THE INVENTION

A generally U-shaped rigid mounting member having a flat bight portion, and parallel legs, loosely straddles the bar and stem of a metallic T-post in C-clamp fashion.

A pair of U-shaped wire support members, each journalling an insulator spool between its legs outwardly from its bight portion, have a threaded bolt centrally secured to the respective bight portion and project opposite the insulating spool.

One of the bolts threadedly enters one leg of the mounting member adjacent the T-post stem and opposite the position of the mounting member bight portion while the other bolt enters the other leg of the mounting member and abuts the T-post bar medially its width for impinging the T-post stem vertical edge against the first mentioned leg of the mounting member contacting the post stem portion.

The principal objects of this invention are to: provide electric fence wire insulating members which effectively insulate an electrically charged wire from its supporting metallic posts; maintain the wire in a selected elevation, relative to the surface of the earth, when crossing terrain elevated or lowered from the general plane of the surrounding area; insulate the wire from the supporting post at an angular turn or direction of the fence wire, such as a corner post; and, further facilitate ease in placing tension on the wire by pulley-like action of the wire insulators of the invention.

DESCRIPTION OF THE PREFERRED EMBODIMENTS

Figure 1:
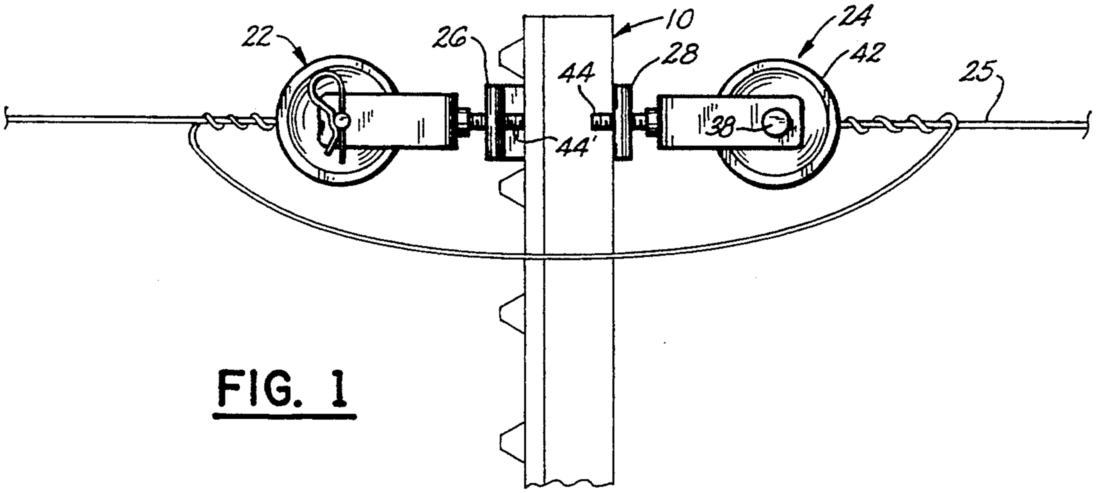
FIG. 1 is a side elevational view of the device supporting a wire on a fragment of a T-post.
Figure 3:
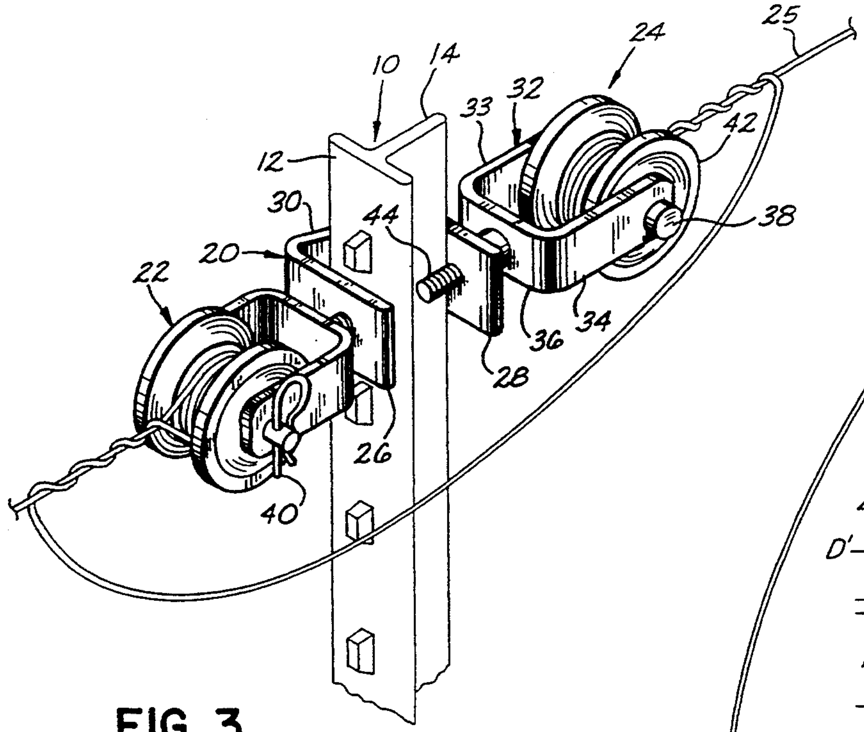

Like characters of reference designate like parts in those figures of the drawings in which they occur.

In the drawings:

The reference numeral 10 indicates a fragment of a metallic T-post having a bar portion 12 normal to its stem portion 14. The bar portion 12 being provided with outstanding lugs, vertically spaced apart, medially the width of the bar to prevent vertical movement of a member attaching wire to the post.

The reference numeral 20 indicates a post wire insulator mounting member, preferably formed from strap-like rigid material, for attaching wire insulating and supporting members 22 and 24 to the post 10.

The mounting member 20, preferably formed from strap-like material, is characterized by uneven length parallel legs 26 and 28 interconnected by a bight portion 30 angularly inclined with respect to the planes of the legs 26 and 28 on an angle substantially parallel with a tangent line extending from one side of the T-bar 12 to the edge of its stem 14, opposite the T-bar.

When the leg 26 is disposed parallel with the vertical plane of the T-bar 12, the spacing between the legs 26 and 28 is greater than the combined distance D between the post bar 12 and its stem edge opposite the bar by a distance D' which permits ease in attaching the member 20 to the T-post 10, as hereinafter explained.

Since the wire supporting insulating members 22 and 24 are identical only the wire insulating member 24 is described in detail.

The wire insulating member 24 comprises a U-shaped bracket 32 having parallel legs 33 and 34 interconnected by a flat bight portion 36. The end portions of the legs 33 and 34, opposite its bight portion, are cooperatively apertured for receiving a bolt 38 secured by a clip pin 40 and acting as an axle for journalling a spool 42 formed from dielectrical material.

The bight portion 36 of the insulator bracket 32 is rigidly connected with a threaded rod such as the head of a stud bolt 44 threadedly projecting through the leg 28 of the member 20 and adjacent the T-post stem 14 opposite the mounting member bight portion 30.

Figure 2:
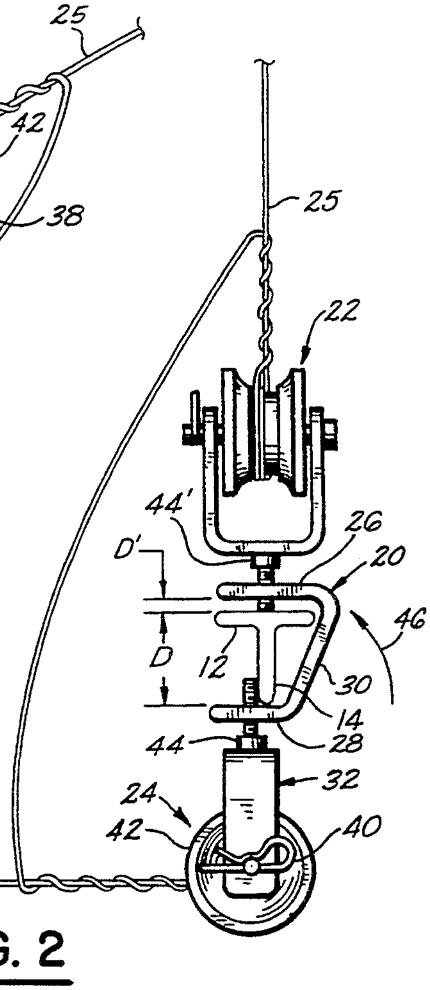
FIG. 2 is a top view illustrating the device and the relative position of its wire insulators in supporting the wire at a corner position of a fence run; and, FIG. 3 is a perspective view of the device, as illustrated by FIG. 1.

As best shown by FIG. 2, the stud bolt 44' of the wire insulator bracket 22 enters the mounting member leg 26 and abuts the adjacent outer surface of the T-bar 12 substantially medially its width and aligned with the vertical plane of the stem 14 which impinges the member 20 leg 28 against the edge of the post stem 14 opposite its bar 12.

Operation

Assuming a fence row comprising a plurality of the posts 10 has been driven into the surface of the earth in selected spaced apart relation; insulating units comprising the clamp member 20; wire insulating units 22 and 24 are provided for each post 10; the stud bolts 44 and 44' have been engaged with the respective legs 28 and 26 of the member 20; the stud bolt 44 preferably being inserted through the leg 28, as illustrated by FIG. 2; and, the stud bolt 44' of the unit 22 not projecting through the clamp leg 26.

The inner surface of the clamp leg 28 is positioned against the edge surface of the T-stem 14 opposite the bar 12 with the bolt 44 adjacent the side of the stem 14 opposite the member 20 bight 30.

The longer leg 26 may then be moved in an circular direction with respect to the T-post 10, substantially in the direction of the arrow 46 until the leg 26 is parallel with the T-bar 12 and while manually holding the member 20 in this position, the insulator unit 22 is angularly rotated about the axis of its stud bolt 44' in a thread tightening action to extend the end of the bolt, opposite the bight portion 36 to abut the T-bar 12 and secure the member 20 to the post 10.

The wire 25 may then be connected in a conventional manner with the respective spool 42 as by wrapping it around the spool and itself and spanning the position of the post 10.

In the event the post 10, illustrated by FIG. 2, is a corner post one of the wire insulator assemblies, for example the assembly 24, may be angularly rotated 90° about the axis of its bolt 44 to dispose the spool axle pin 38 vertically which permits the wire 25, connected with the unit 24, to extend in a 90° direction with respect to the other portion of the wire 25 connected with the spool assembly 22.

Obviously the invention is susceptible to changes or alterations without defeating its practicability. Therefore, I do not wish to be confined to the preferred embodiment shown in the drawings and described herein.

I claim:

1. An electric fence wire insulator for attachment to a T-shaped post having a stem portion normal to a bar portion, comprising:

a generally U-shaped mounting member having unequal length parallel legs capable of loosely transversely straddling a T-shaped post across an intermediate portion of its stem and bar and having a planar bight portion inclined with respect to the parallel planes of the mounting member legs and substantially parallel with a vertical plane tangentially contacting a laterally outward limit of a T-shaped post stem and one side edge of its bar; and, wire supporting means including opposing U-shaped brackets each having a bight portion and having a bolt secured to the bracket bight portion and threadedly extending through the respective mounting member leg for respectively frictionally contacting a T-shaped post bar opposite its stem and the stem surface opposite the mounting member inclined bight portion and securing the mounting member to a T-shaped post.

2. The fence wire insulator according to claim 1 in which each said U-shaped bracket further includes:

parallel legs projecting from the U-shaped bracket bight portion and having an axle extending between the bracket legs opposite its bight portion; and, a dielectric spool journalled by the axle.

* * * * *